(12) United States Patent
Nordbruch

(10) Patent No.: US 10,279,840 B2
(45) Date of Patent: May 7, 2019

(54) METHOD AND DEVICE FOR OPERATING A VEHICLE

(71) Applicant: Robert Bosch GmbH, Stuttgart (DE)

(72) Inventor: Stefan Nordbruch, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/517,274

(22) PCT Filed: Sep. 29, 2015

(86) PCT No.: PCT/EP2015/072350
§ 371 (c)(1),
(2) Date: Apr. 6, 2017

(87) PCT Pub. No.: WO2016/066358
PCT Pub. Date: May 6, 2016

(65) Prior Publication Data
US 2017/0305466 A1    Oct. 26, 2017

(30) Foreign Application Priority Data

Oct. 27, 2014   (DE) ................. 10 2014 221 749

(51) Int. Cl.
*B62D 15/02*    (2006.01)
*G08G 1/14*    (2006.01)
(Continued)

(52) U.S. Cl.
CPC .......... *B62D 15/0285* (2013.01); *B60R 25/00* (2013.01); *G08B 25/10* (2013.01);
(Continued)

(58) Field of Classification Search
CPC .................................... B62D 15/0285
(Continued)

(56) References Cited

U.S. PATENT DOCUMENTS

| 6,059,063 A * | 5/2000 | Shimizu | B62D 15/0285 180/204 |
| 7,904,246 B2 * | 3/2011 | Kondoh | B60W 50/16 180/167 |

(Continued)

FOREIGN PATENT DOCUMENTS

| CN | 103777632 A | 5/2014 |
| CN | 103879403 A | 6/2014 |

(Continued)

OTHER PUBLICATIONS

International Search Report dated Feb. 11, 2016 of the corresponding International Application PCT/EP2015/072350 filed Sep. 29, 2015.

*Primary Examiner* — Santiago Garcia
(74) *Attorney, Agent, or Firm* — Norton Rose Fulbright US LLP; Gerard Messina

(57) ABSTRACT

A method for operating a vehicle includes the vehicle receiving a start signal for starting the vehicle via a communication network, and responding to the start signal only when one or multiple predetermined conditions are met. Additionally, a device for operating a vehicle, a parking facility management server, and a computer program can be provided for restricting a response to a start signal to only when the one or multiple predetermined conditions are met.

12 Claims, 2 Drawing Sheets

(51) Int. Cl.
*G08B 25/10* (2006.01)
*B60R 25/00* (2013.01)

(52) U.S. Cl.
CPC ............. *G08G 1/146* (2013.01); *G08G 1/148* (2013.01); *G08G 1/149* (2013.01)

(58) Field of Classification Search
USPC .......................................................... 340/436
See application file for complete search history.

(56) References Cited

U.S. PATENT DOCUMENTS

| | | | | |
|---|---|---|---|---|
| 8,260,538 | B2* | 9/2012 | Noda | B60T 7/22 340/435 |
| 9,697,733 | B1* | 7/2017 | Penilla | G08G 1/163 |
| 2005/0030156 | A1* | 2/2005 | Alfonso | B60R 25/04 340/5.61 |
| 2006/0087405 | A1* | 4/2006 | Koike | B60R 25/04 340/5.64 |
| 2010/0156672 | A1 | 6/2010 | Yoo et al. | |
| 2012/0188100 | A1 | 7/2012 | Min et al. | |
| 2013/0054060 | A1* | 2/2013 | Dupuy | F02D 17/04 701/22 |
| 2013/0219294 | A1* | 8/2013 | Goldman-Shenhar | G06F 3/0484 715/751 |
| 2013/0231824 | A1 | 9/2013 | Wilson et al. | |
| 2014/0274013 | A1* | 9/2014 | Santavicca | H04W 4/008 455/418 |
| 2015/0073685 | A1* | 3/2015 | Choi | F02N 11/0807 701/113 |
| 2017/0025004 | A1* | 1/2017 | Nordbruch | G08G 1/005 |

FOREIGN PATENT DOCUMENTS

| | | |
|---|---|---|
| DE | 102008051982 A1 | 6/2009 |
| EP | 2295281 A1 | 3/2011 |
| EP | 2316709 A2 | 5/2011 |
| JP | 2004218444 A | 8/2004 |
| JP | 2008215136 A | 9/2008 |
| JP | 2013123095 A | 6/2013 |
| WO | 2012019899 A1 | 2/2012 |
| WO | 2014146196 A1 | 9/2014 |

* cited by examiner

METHOD AND DEVICE FOR OPERATING A VEHICLE

CROSS-REFERENCE TO RELATED APPLICATIONS

The present application is the national stage of International Pat. App. No. PCT/EP2015/072350 filed Sep. 29, 2015, and claims priority under 35 U.S.C. § 119 to DE 10 2014 221 749.0, filed in the Federal Republic of Germany on Oct. 27, 2014, the content of each of which is incorporated herein by reference in its entirety.

FIELD OF THE INVENTION

The present invention relates to a method and to a device for operating a vehicle. The present invention furthermore relates to a parking facility management server for a parking facility. The present invention moreover relates to a computer program.

BACKGROUND

In the case of fully automated (autonomous), so-called valet, parking, a driver parks a vehicle in a drop-off spot, e.g., in front of a parking garage, and the vehicle drives autonomously from there into a parking position/parking space and back to the drop-off spot. In the interim period, i.e., during the time it is parked, the vehicle sits switched off in the parking position/parking space.

One requirement for this process may be, for example, that a parking facility management system must be able to start the vehicle without human assistance using a signal initiated from outside the vehicle. Furthermore, such a start with the aid of a parking facility management system may also be necessary during a transfer at the drop-off spot if the vehicle is already switched off. For example, such a start may also be useful and necessary in the case of a re-parking during the parking process. Such a re-parking may include, for example, that an electric vehicle is to be re-parked from a parking space having a charging station to a parking space without such a charging station.

SUMMARY

A need thus exists to ensure access to the vehicle with the aid of such a start signal with respect to legitimacy and security (theft protection).

It is thus an object of the present invention to provide a method for operating a vehicle which is able to ensure access to the vehicle with respect to legitimacy and security (theft protection).

It is also an object of the present invention to provide a corresponding device for operating a vehicle.

It is another object of the present invention to provide a parking facility management server for a parking facility.

It is yet another object of the present invention to provide a corresponding computer program.

According to one aspect, a method for operating a vehicle includes the vehicle receiving, via a communication network, a start signal for starting the vehicle, the vehicle in response to the start signal autonomously starting only when one or multiple predetermined conditions are met.

According to another aspect, a device for operating a vehicle includes a communication interface designed to receive a start signal for starting the vehicle via a communication network, and a starting device designed to autonomously start the vehicle in response to the start signal when one or multiple predetermined conditions are met.

According to one further aspect, a parking facility management server for a parking facility is provided, including a processor designed to generate a start signal for starting a vehicle, and a communication interface designed to transmit the start signal via a communication network to a vehicle.

According to still another aspect, a computer program is provided, which includes program code for carrying out the method for operating a vehicle when the computer program is executed on a computer.

According to one aspect, a vehicle is provided which is configured to carry out the method for operating a vehicle.

According to one specific embodiment, the vehicle includes the device for operating a vehicle.

Thus, according to example embodiments of the present invention, access to the vehicle is allowed with the aid of a vehicle-external start signal for starting the vehicle only when one or multiple predetermined conditions are met. This in particular yields the technical advantage that access to the vehicle can be restricted. This means in particular that a start signal per se is no longer sufficient to start the vehicle. The reason is that, additionally, one or multiple predetermined conditions must be met. In this way, security (e.g., theft protection) can advantageously be increased. In particular, access with respect to legitimacy can be ensured.

A parking facility within the meaning of the present invention can also refer to a parking area and serves as a parking area for vehicles. The parking facility thus forms in particular a contiguous area which includes multiple parking spaces (in the case of a parking facility on private property) or parking positions (in the case of a parking facility on public property). According to one specific embodiment, the parking facility includes a parking deck. In an example, the parking facility includes a parking garage.

Autonomously, within the meaning of the present invention, means in particular that the vehicle navigates or drives independently, i.e., without an intervention of a driver. The vehicle thus drives independently on the parking facility, without a driver having to steer the vehicle for this purpose. The driver no longer has to be personally present in the vehicle. Such an autonomously driving vehicle, which is able to automatically pull into and out of a parking spot, is also referred to as an Automatic Valet Parking (AVP) vehicle, for example, a its process of parking can be referred to as an "automatic parking process." Vehicles which do not have this AVP functionality are referred to as normal vehicles, for example.

A drop-off position within the meaning of the present invention is a position at which a driver of the vehicle can drop off his/her vehicle for an autonomous parking process and may pick up the vehicle again at a later point in time.

A parking position within the meaning of the present invention is a position in which the vehicle is to park autonomously.

In one specific embodiment, it is provided that the vehicle autonomously navigates from the drop-off position to the parking position.

In one further specific embodiment, it is provided that the vehicle autonomously pulls into the parking position.

In one other specific embodiment, it is provided that the vehicle autonomously pulls out of the parking position.

According to one further specific embodiment, it is provided that the vehicle autonomously navigates from the parking position to the drop-off position.

According to one specific embodiment, it is provided that the one or multiple conditions include that an instantaneous vehicle position must be within a predetermined spatial area for the vehicle to start autonomously in response to the start signal. This in particular yields the technical advantage that the vehicle must be situated within the predetermined spatial area in order to start the vehicle with the aid of the vehicle-external start signal. If the vehicle is situated outside the predetermined spatial area, the vehicle can no longer be autonomously started.

According to one specific embodiment, it is provided that the predetermined spatial area is assigned to a parking process. The predetermined spatial area being assigned to a parking process means in particular that the vehicle is able to park autonomously within the predetermined spatial area. A parking process generally requires a certain area to carry out the individual parking maneuvers, e.g., driving to the parking position, pulling into the parking space, pulling out of the parking space, and returning to the drop-off position. This area required for this purpose is included in the predetermined spatial area. According to this specific embodiment, it is thus ensured that the vehicle may only be started with the aid of the start signal when the vehicle is situated within the area in which it is able to carry out a parking process.

According to one specific embodiment, it is provided that the predetermined spatial area includes or is a parking facility. This in particular yields the technical advantage that the vehicle can only be started within the parking facility with the aid of the start signal. When the vehicle is situated outside the parking facility, i.e., after leaving the parking facility, it is no longer possible to start the vehicle with the aid of the start signal. In this way, an access to the vehicle by a parking facility management server is advantageously made possible within the scope of an automatic valet parking process, but not outside such an automatic valet parking process.

The spatial area is defined, for example, with the aid of the layout of the parking facility, in particular the parking garage, preferably using a delta to prevent inaccuracies, and/or is defined, for example, by a perimeter around a point (e.g., a GPS coordinate).

In one other specific embodiment, it is provided that the one or multiple conditions include that an instantaneous time is within a predetermined time window for the vehicle to start autonomously in response to the start signal. This in particular yields the technical advantage that the vehicle can only be started at certain times with the aid of the start signal. Outside these times, it is no longer possible to start the vehicle with the aid of the start signal. In this way, an access to the vehicle can advantageously be limited only to certain times.

According to one further specific embodiment, it is provided that the predetermined time window corresponds to a parking duration of the vehicle in a parking facility. This in particular yields the technical advantage that an access to the vehicle for the purpose of starting the vehicle is only possible during the parking duration of the vehicle. This means in particular that access to the vehicle is no longer possible when the vehicle is no longer parked, but has driven away from the parking facility.

The limitation with respect to time, i.e., the predetermined time window, can thus be either a defined time window (for example 2 hours) or preferably be defined by the end of the parking process. Furthermore, the predetermined time window can be defined, for example, by a "continuous time window" (e.g., one year) if the driver uses the parking facility, in particular the parking garage, more frequently.

According to one further specific embodiment, it is provided that a vehicle start certificate is transmitted to a parking facility management server of a parking facility, the vehicle start certificate defining a predetermined time window and/or a predefined spatial area within which the parking facility management server is able to start the vehicle with the aid of the start signal.

This in particular yields the technical advantage that the parking facility management server gains knowledge about time periods during which and areas in which access to the vehicle on the part of the parking facility management server is possible.

In one other specific embodiment, it is provided that, in response to an autonomous starting of the vehicle in response to the received start signal, an information signal is transmitted via the communication network to a user of the communication network that the vehicle has started in response to the start signal.

This in particular yields the technical advantage that the user of the communication network is informed that the vehicle was started in response to the start signal. The user of a communication network is a mobile telephone, for example. Such a mobile telephone belongs to a driver of the vehicle, for example. The driver of the vehicle thus knows that a vehicle has just been started.

According to another specific embodiment, it is provided that the vehicle switches off autonomously when it has not received a confirmation signal from the user via the communication network that the vehicle is to remain switched on. This in particular yields the technical advantage that an express approval must be given for the vehicle to remain switched on. The driver of the vehicle is thus able to transmit the confirmation signal to the vehicle via his/her mobile telephone. This means in particular that the driver must explicitly provide his/her approval that the vehicle is to remain switched on.

In another specific embodiment, it is provided that the vehicle switches off in response to a receipt of a termination signal of the user transmitted via the communication network. This in particular yields the technical advantage that the vehicle switches off again in the case of an explicit termination request of a driver. The driver ultimately maintains control over whether or not his/her vehicle remains switched on.

In another specific embodiment, it is provided that, prior to the autonomous starting of the vehicle, an information signal is transmitted via the communication network to a user of the communication network that the vehicle is to be started in response to a start signal. This means that the driver of the vehicle is informed about the upcoming starting process even before a starting of the vehicle. The driver thus may or may not provide his/her express approval.

According to another specific embodiment, it is provided that the vehicle does not switch on autonomously when it has not received a confirmation signal from the user of the communication network.

Functionalities of the device and of the parking facility management server are derived analogously from the functionalities of the method, and vice versa.

The present invention is described in greater detail hereafter based on preferred exemplary embodiments.

DETAILED DESCRIPTION

Figure 1:
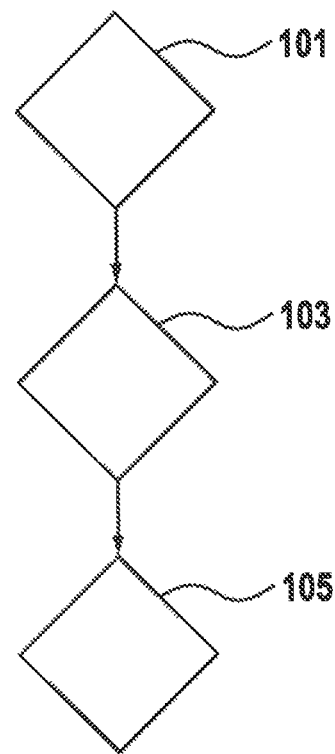
FIG. 1 is a flowchart that illustrates a method for operating a vehicle, according to an example embodiment of the present invention.

FIG. 1 is a flowchart of a method for operating a vehicle, according to an example embodiment of the present invention. According to a step 101, the vehicle receives a start signal for starting the vehicle via a communication network. This means that the start signal is a prompt to the vehicle that the vehicle is starting autonomously.

A starting within the meaning of the present invention includes in particular a starting of a drive engine or motor of the vehicle. A drive engine or motor of the vehicle is an electric motor, for example, or an internal combustion engine or a hybrid motor, i.e., a combination of an electric motor and an internal combustion engine.

In a step 103, the vehicle checks, in response to the start signal, whether one or multiple predetermined conditions are met. Only if one or multiple predetermined conditions are met does the vehicle start autonomously according to a step 105.

This means, for example, that a start signal must be present on the one hand, and one or multiple predetermined conditions must be met on the other hand, for the vehicle to start autonomously.

Figure 2:
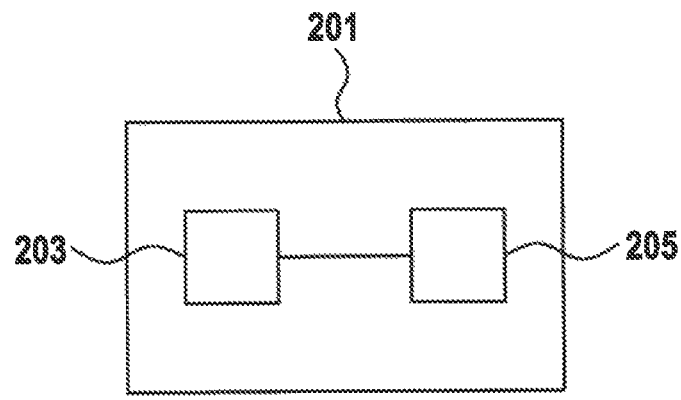
FIG. 2 shows a device for operating a vehicle, according to an example embodiment of the present invention.

FIG. 2 shows a device 201 for operating a vehicle, according to an example embodiment of the present invention. Device 201 includes a communication interface 203, which is designed to receive a start signal for starting the vehicle via a communication network. Device 201 includes a starting device 205, which is designed to autonomously start the vehicle in response to the start signal when one or multiple predetermined conditions are met. The check as to whether or not the conditions are met is carried out with the aid of the starting device, for example. In particular, this is carried out with the aid of a control unit.

According to one specific embodiment, device 201 is designed to carry out the method for operating a vehicle.

The idea according to the present invention to make an access to the vehicle not only dependent on a start signal, but also on certain conditions is in particular advantageous during an automatic valet parking process, i.e., an automatic parking process. It is provided, for example, that the conditions are selected corresponding to the specific requirements of the automatic valet parking process, so that an access to the vehicle for starting the vehicle with the aid of the start signal is only possible within the scope of the valet parking process. An access is disallowed outside the automatic parking process, which means that a start signal then no longer starts the vehicle.

According to one specific embodiment, it is provided, for example, that the access to the vehicle remains spatially limited to the parking facility and/or limited to the parking duration. As soon as the vehicle has left the parking facility and/or a parking duration has elapsed, access to the vehicle with the aid of the start signal is no longer possible.

Figure 3:
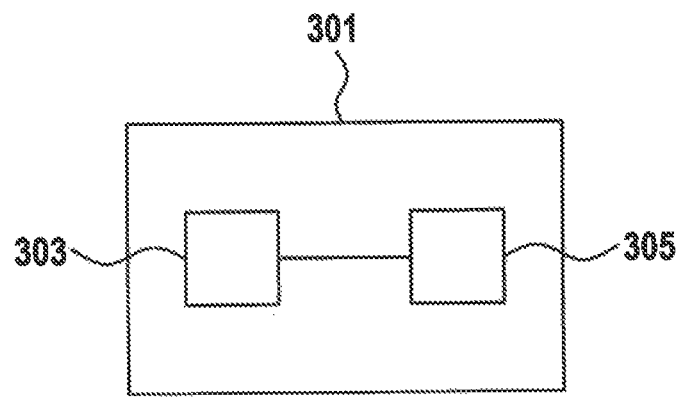
FIG. 3 shows a parking facility management server for a parking facility, according to an example embodiment of the present invention.

FIG. 3 shows a parking facility management server 301 for a parking facility. The parking facility management server 301 includes a processor 303, which is designed to generate a start signal for starting a vehicle. Parking facility management server 301 furthermore includes a communication interface 305, which is designed to transmit the start signal via a communication network to a vehicle.

According to another aspect, a parking facility is provided, which includes parking facility management server 301.

Figure 4:
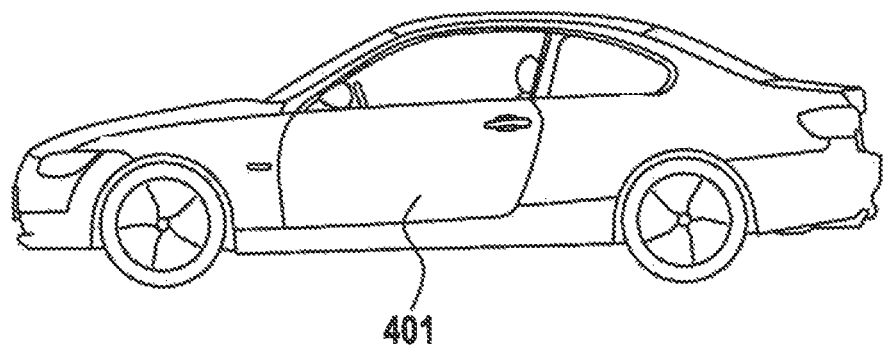
FIG. 4 shows a vehicle according to an example embodiment of the present invention.

FIG. 4 shows a vehicle 401. Vehicle 401 is designed to carry out a method according to the present invention for operating the vehicle. For example, vehicle 401 includes the device according to the present invention for operating a vehicle. Vehicle 401 is an autonomously driving vehicle, for example. In particular, vehicle 401 is an AVP vehicle. This means that vehicle 401 is able to autonomously drive in a parking facility and pull into and out of parking positions.

The present invention thus in particular provides the option that a parking facility management server, which can be included in a parking facility management system, for example, is able to start the vehicle using a signal initiated from outside the vehicle (the start signal), e.g., via a WLAN communication and/or via a C2X communication, without human assistance (e.g., with the aid of pushing a button in the vehicle). Such a start is required at least after a parking phase for the retrieval (return) from the parking position to the drop-off position. Furthermore, such a start can be possible or necessary in the following situations: a transfer at the drop-off spot or drop-off position if the vehicle is already switched off; and/or a re-parking during the parking process, e.g., an electric vehicle is to be re-parked from a parking space having a charging station to a parking space without such a charging station.

With the aid of the present invention, it is advantageously made possible that an access to the vehicle for the automatic parking process (automatic valet parking) can be ensured with respect to legitimacy and security (theft protection).

According to one specific embodiment, it is provided, for example, that it is only possible to start the vehicle based on the signal initiated from outside (start signal, e.g., transmitted with the aid of WLAN communication) during the time window of the parking process and/or in the spatial area of the parking process (e.g., in the parking garage or in the parking facility). Outside the time window and/or outside the spatial area, the start of the vehicle is rejected by the vehicle system, i.e., in particular the described device.

The spatial extent can be defined, for example, very precisely by the layout of the parking garage (if necessary, preferably using a delta for prevention against inaccuracies) and/or by a perimeter around a point (e.g., GPS coordinate).

The limitation with respect to time can either be a defined time window (e.g., 2 hours) or can be defined by the end of the parking process. Furthermore, it can be defined by a "continuous time window" (e.g., one year) if the driver uses the parking garage or the parking facility more frequently.

According to one specific embodiment, a "vehicle start certificate," which includes the temporal aspect and the spatial aspect, is transmitted to the parking facility management system. This is similar to a temporally limited "WLAN booking" in a hotel.

In one further specific embodiment, it is provided that the certificate is simultaneously defined for multiple parking garages/parking facilities (e.g., by a parking garage chain).

In one further specific embodiment, it is provided that the driver/owner is informed about the signal initiated from outside (e.g., via mobile telephone) during the start of the vehicle.

In one further specific embodiment, it is provided that the driver/owner must give his/her approval (e.g., again via mobile telephone) after being informed.

In one further specific embodiment, it is provided that the driver/owner is able to terminate/refuse the starting process at any time.

In another specific embodiment, the entire data traffic (i.e., the communication via the communication network) and the certificate between the vehicle, mobile telephone, and parking facility management system are encrypted.

What is claimed is:

1. A method for operating a vehicle, the method comprising:
    receiving, from a parking facility management server, by the vehicle and via a communication network, a start signal for starting the vehicle, wherein the start signal is initiated from outside the vehicle; and
    responding, by the vehicle, to the receiving of the start signal by autonomously starting and autonomously steering the vehicle, wherein the responding is performed conditional upon satisfaction of at least one predetermined condition,
    wherein the at least one predetermined condition includes that an instantaneous position of the vehicle is within a predetermined spatial area and that an instantaneous time is within a predetermined time window.

2. The method of claim 1, wherein the predetermined spatial area is assigned to a parking process.

3. The method of claim 1, wherein the predetermined spatial area includes a parking facility.

4. The method of claim 1, wherein the predetermined time window corresponds to a parking duration of the vehicle in a parking facility.

5. The method of claim 1, wherein a vehicle start certificate is transmitted to a parking facility management server of a parking facility, the vehicle start certificate defining at least one of a predetermined time window and a predetermined spatial area within which the parking facility management server is able to start the vehicle using the start signal.

6. The method of claim 1, wherein, in response to the autonomous starting of the vehicle, an information signal, indicating that the vehicle has started in response to the start signal, is transmitted via the communication network to a user of the communication network.

7. The method of claim 6, further comprising:
    the vehicle switching off autonomously when the vehicle does not receive a confirmation signal, from the user via the communication network, that the vehicle is to remain switched on.

8. The method of claim 6, further comprising:
    the vehicle switching off in response to a receipt, transmitted via the communication network, of a termination signal of the user.

9. The method of claim 1, wherein, prior to the autonomous starting of the vehicle, an information signal is transmitted, via the communication network and to a user of the communication network, the signal indicating that the vehicle will be started in response to the start signal.

10. A device for operating a vehicle, the device comprising:
    a communication interface to a communication network; and
    a starting device, wherein, conditional upon satisfaction of at least one predetermined condition, the starting device is configured to start and steer the vehicle autonomously in response to a start signal that is received from the communication network of a parking facility management server via the communication interface, wherein the start signal is initiated from outside the vehicle, wherein the at least one predetermined condition includes that an instantaneous position of the vehicle is within a predetermined spatial area and that an instantaneous time is within a predetermined time window.

11. A parking facility management server for a parking facility, the server comprising:
    a communication interface to a communication network; and
    processing circuitry, wherein the processing circuitry is configured to generate, and transmit to a vehicle over the communication network and via the communication interface, a start signal for starting and steering a vehicle, wherein the start signal is initiated from outside the vehicle.

12. A non-transitory computer-readable medium on which are stored instructions that are executable by a processor of a vehicle and that, when executed by the processor, cause the processor to perform a method for operating the vehicle, the method comprising:
    receiving, from a parking facility management server, via a communication network, a start signal for starting the vehicle, wherein the start signal is initiated from outside the vehicle; and
    responding, by the vehicle, to the receiving of the start signal by autonomously starting and autonomously steering the vehicle, wherein the responding is performed conditional upon satisfaction of at least one predetermined condition,
    wherein the at least one predetermined condition includes that an instantaneous position of the vehicle is within a predetermined spatial area and that an instantaneous time is within a predetermined time window.

* * * * *